United States Patent Office  3,514,483  
Patented May 26, 1970

3,514,483
PROCESS FOR SYNTHESIZING UREA
Eiji Otsuka, Kazumichi Kanai, and Tadao Sakai, Fujisawa, and Shigeru Inoue, Kamakura, Japan, assignors to Mitsui Toatsu Chemicals Incorporated, Tokyo, Japan, a corporation of Japan
Filed Nov. 22, 1966, Ser. No. 596,312
Claims priority, application Japan, Nov. 26, 1965,
40/72,203
Int. Cl. C07c 127/00
U.S. Cl. 260—555                                    7 Claims

ABSTRACT OF THE DISCLOSURE

An improvement in a cyclic process for producing urea wherein ammonia and carbon dioxide are reacted to form an effluent containing urea, water, unreacted ammonia and unreacted carbon dioxide, and wherein the unreacted ammonia and unreacted carbon dioxide are recirculated into the urea synthesis zone, comprising adding to said effluent a compound selected from n-paraffins, n-olefins, substituted n-paraffins and substituted n-olefins thereby forming a crystalline adduct of urea and said compound, separating the crystalline adduct from the effluent, decomposing the separated adduct to release urea and said compound, removing the released urea, removing a portion of the water from the effluent after removal of said adduct and recycling said effluent containing unreacted ammonia, unreacted carbon dioxide and the remaining portion of the water after removal of said adduct and said water to said urea synthesis zone.

---

Figure 1:
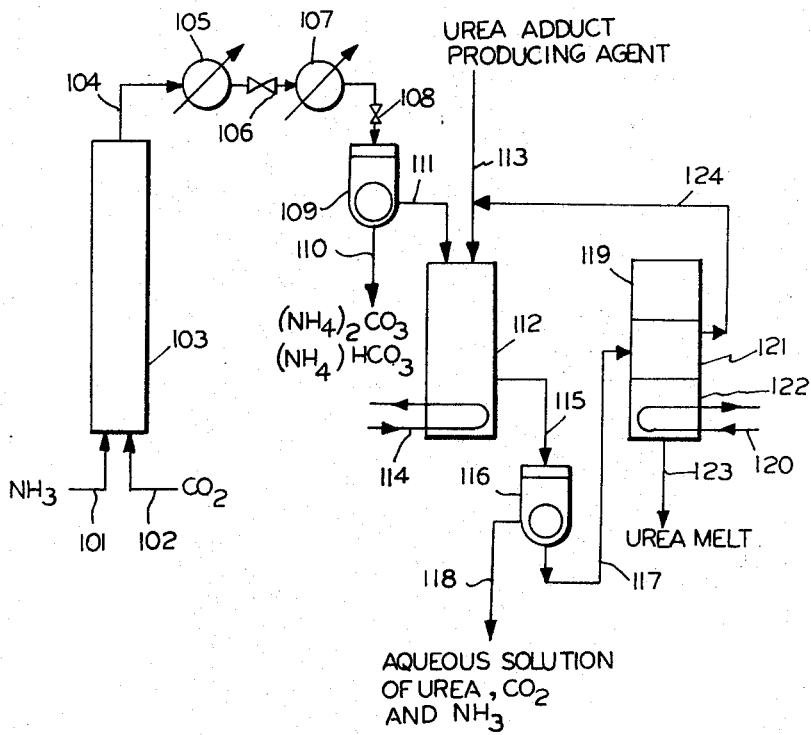

This invention relates to an improved process for synthesizing urea from ammonia and carbon dioxide.

Urea is industrially produced by reacting ammonia with carbon dioxide at high pressures and temperatures. This reaction proceeds in accordance with the following formulas:

$$2NH_3 + CO_2 \rightarrow NH_4COONH_2 \tag{1}$$

$$NH_4COONH_2 \rightarrow NH_2CONH_2 + H_2O \tag{2}$$

The reaction of the Formula 1 is completed easily but the reaction of the Formula 2 does not conclude under conventional urea synthesis conditions. Therefore, it is a customary practice, common to all conventional urea synthesizing processes irrespective of whether they are noncyclic processes or cyclic processes, to heat a urea synthesis effluent at a pressure below the urea synthesis pressure so that unreacted ammonia and carbon dioxide may be separated from the urea synthesis effluent as gaseous ammonia and carbon dioxide. In the cyclic process, the separated ammonia and carbon dioxide are absorbed in water or an aqueous solution of urea, or are compressed as gases as they are, and then are recirculated to the urea synthesis zone. In the non-cyclic process, the ammonia is absorbed in sulfuric acid or nitric acid and recovered as ammonium sulfate or ammonium nitrate. In either case, the amount of heat required to separate unreacted ammonia and carbon dioxide is so large that 60 to 80% of steam consumed in the production of urea is used for the separation of the unreacted ammonia and carbon dioxide from the urea synthesis effluent. Furthermore, a plurality of separators are required. Since such separators are to handle the corrosive urea synthesis effluent at high temperatures, the corrosion of the separators can not be neglected. In the solution recycle process wherein separated unreacted ammonia and carbon dioxide are absorbed in an absorbent and are circulated to the urea synthesis zone, substantially the same amount of heat as is required for the separation is generated in absorbing the unreacted ammonia and carbon dioxide and the generated heat must be removed by cooling. It has been known to recover the heat of absorption by utilizing it to separate unreacted ammonia and carbon dioxide from the effluent or to concentrate the resulting aqueous solution of urea. But, whereas heating steam and cooling water can be saved by employing the heat recovery method, it is inevitable that the apparatus and operation needed to accomplish this are quite complicated. Therefore, it is desired to separate urea or urea and water from the urea synthesis effluent without separating unreacted ammonia and carbon dioxide by the utilization of heat.

An object of the present invention is to provide a urea synthesizing process wherein steam consumption is minimized.

Another object of the present invention is to provide a urea synthesizing process wherein urea low in biuret content is obtained.

A further object of the present invention is to provide an improved complete recycle urea synthesizing process wherein the amounts of steam and cooling water used are minimized.

According to the process of the present invention, a urea synthesis effluent obtained by reacting ammonia and carbon dioxide at a urea synthesizing pressure and temperature is cooled and its pressure is reduced. A hydrocarbon (which shall be referred to hereinafter as a "urea adduct producing agent") having as the main constituent an n-paraffin (n-alkane) or n-olefin (n-alkene) having 6 to 25, preferably 10 to 20 carbon atoms, either in unsubstituted form or substituted at a terminal carbon atom with a phenyl-, cyclohexyl-, phenyloxycarbonyl- or cyclohexyloxycarbonyl-radical is added to the effluent at a urea adduct producing temperature to form a urea adduct as crystalline material. The substituted n-paraffins and n-olefins include phenyl or cyclohexyl alkanes, alkenes, alkanoates or alkenoates, e.g.,

or

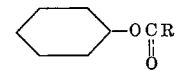

wherein R is an n-paraffinic radical (n-alkyl) or an n-olefinic radical (n-alkenyl) and has 6 to 25, preferably 10 to 20, carbon atoms.

Specific examples of urea adduct producing agents include n-hexadecane, n-octadecane, 1-hexadecane, n-decane, 1-decene, n-eicosane, n-dodecane, n-nonadecane, n-undecane, 1-undecene, 1-dodecene, 1-eicosene, 9-octadecene, 1-octadecene phenyl 9-octadecenoate, cyclohexyl 9-octadecenoate, phenyl stearate, cyclohexyl stearate, phenyl eicosanoate, cyclohexyl eicosanoate, phenyl decanoate, cyclohexyl decanoate, phenyl hendecanoate, cyclohexyl hendecanoate, phenyl 9-hendecenoate, cyclohexyl 9-hendecenoate, phenyl 10 - hendecenoate, cyclohexyl 10-hendecenoate, phenyl laurate, cyclohexyl laurate, n-decylbenzene, n-decylcyclohexane, laurylbenzene, laurylcyclohexane, stearylbenzene, stearylcyclohexane and the like. The produced urea adduct crystals are separated from the urea synthesis effluent and then are separated into a layer of the hydrocarbon and a layer of a urea melt (an aqueous solution of urea) by heating. The urea adduct producing agent thus separated is reused for the production of urea adduct. On the other hand, product urea is obtained from the urea melt (aqueous solution of urea) by any conventional method. In the cyclic process, the urea synthesis effluent from which the urea adduct has been separated and which then consists of ammonia, carbon dioxide, water and a small amount of urea is treated thereafter by removing the unreacted carbon dioxide, removing an amount of water substantially equivalent to that amount calculated by subtracting the amount of water taken out together with the urea adduct crystal from the amount of water produced in the urea synthesis and is then circulated to the urea synthesis zone.

When the synthesis rate in the urea synthesis zone is comparatively low, that is, the urea synthesis effluent contains comparatively large amounts of unreacted ammonia and carbon dioxide, the urea synthesis effluent is cooled to 30 to 40° C., a part of the unreacted ammonia and carbon dioxide is removed as ammonium carbonate and ammonium bicarbonate crystals prior to adding the urea adduct producing agent. When the urea synthesis is carried out by using excess ammonia, the pressure of the urea synthesis effluent is reduced and the greater part of the excess ammonia is thus separated from the effluent prior to adding the urea adduct producing agent. In this case, the amounts of the unreacted ammonia and carbon dioxide in the urea synthesis effluent from which excess ammonia has been separated are usually so small that the operation of removing a part of the unreacted ammonia and carbon dioxide as ammonium carbonate and ammonium bicarbonate crystals can be omitted. The separated excess ammonia is cooled and liquefied and is circulated in the urea synthesis zone.

It is preferable that the urea adduct producing temperature be below 40° C., specifically 30 to 40° C. When producing the urea adduct, small amounts of ammonium carbonate and ammonium bicarbonate may be crystallized. In this case, they can be redissolved by adding water or can be separated as gaseous ammonia and carbon dioxide when decomposing the urea adduct crystal by heating.

The amount of urea adduct producing agent added to a urea synthesis effluent is, preferably, about 0.25 to 0.55 part by weight per 1 part by weight of urea to be separated as the urea adduct. After separating the adduct from the effluent by decantation, filtration or any other suitable method, the adduct is heated to a temperature in the range of 90° C. to 130° C. to decompose it into urea and the adduct producing agent.

In the cyclic process, it is necessary to remove water from the aqueous solution containing unreacted ammonia and carbon dioxide and urea while retaining substantially all the contained ammonia and carbon dioxide in the solution. The amount of water thus removed is substantially equivalent to that amount calculated by subtracting the amount of water accompanying the urea adduct from the total amount of water produced by the urea synthesizing reaction and water added from outside the system. For this purpose, for example, the method mentioned in U.S. Pat. No. 3,146,263 can be used wherein this aqueous solution is brought into contact with gaseous ammonia, carbon dioxide or a mixture of them at 70 to 130° C. under 1 to 5 kg./cm.² (gauge) and water only is removed from the aqueous solution.

According to the present invention, the steam normally required to separate unreacted ammonia and carbon dioxide from urea in the conventional urea synthesis is saved. Since the urea synthesis effluent is not heated to separate the unreacted ammonia and carbon dioxide as in the conventional urea synthesizing process and the urea is separated as a urea adduct crystal, the amount of biuret in the produced urea is very small.

Furthermore, the complete recycle process of the present invention has the further advantage that the amounts of steam and cooling water required are considerably smaller than in the conventional complete recycle process using solution recycle.

The present invention shall now be explained more particularly with reference to the accompanying drawings. FIG. 1 shows the basic process of the present invention. Ammonia coming through pipe 101 and carbon dioxide coming through pipe 102 are introduced into a urea synthesizing autoclave 103 and are made to react with each other at a temperature of 160 to 220° C. under a pressure of 150 to 400 kg./cm.² (gauge).

It is preferable to introduce the ammonia and carbon dioxide in a mol ratio of 2 to 6 mols $NH_3$ per mol $CO_2$. The urea synthesis effluent from the urea synthesizing autoclave 103 in introduced into a precooler 105 through a pipe 104 and is cooled to about 50° C. When urea is synthesized by using excess ammonia, the urea synthesis effluent may be cooled by exchanging heat with liquid ammonia to be introduced into the autoclave 103. The urea synthesis effluent cooled in the precooler 105 has its pressure reduced to 0 to 2 kg./cm.² (gauge) through a pressure reducing valve 106 and is introduced into a crystallizer 107 so that a part of unreacted ammonia and carbon dioxide may be crystallized as ammonia carbonate and ammonium bicarbonate at a temperature of 30 to 40° C. at which no urea is crystallized. When urea is synthesized by using excess ammonia, the urea synthesis effluent from the urea synthesizing autoclave 103 has its pressure reduced and excess ammonia is separated from the urea synthesis effluent prior to introduction into the crystallizer 107. When the urea synthesizing rate is high, this crystallizing operation is not required.

The urea synthesis effluent containing crystals of ammonium carbonate and ammonium bicarbonate has the pressure reduced, if necessary, to the normal pressure through a pressure reducing valve 108 and is separated into an aqueous solution containing urea, ammonia and carbon dioxide and crystals of ammonium carbonate and ammonium bicarbonate by a separator 109.

The separated crystals of ammonium carbonate and ammonium bicarbonate are taken out through pipe 110. The aqueous solution from the separator 109 is introduced into a reactor 112 through pipe 111. A urea adduct producing agent is introduced into the reactor 112 through pipe 113 and is caused to react with the urea in the aqueous solution while stirring to form the urea adduct as crystals. In this case, if ammonium carbonate or ammonium bicarbonate is also crystallized, it should be dissolved by adding a small amount of water. The temperature of the reactor 112 is kept preferably at 30 to 40° C. by a cooler 114. The aqueous solution containing the produced urea adduct crystal is introduced into a separator 116 through pipe 115 and is separated into the urea adduct crystals and an aqueous solution containing urea, ammonia and carbon dioxide. The separated aqueous solution is taken out through a pipe 118, and, after separating any unreacted urea adduct producing agent present, is used together with the ammonium carbonate or ammonium bicarbonate crystal taken out through pipe 110 or separately for the production of chemical fertilizers, for example, or is recirculated and reused for the synthesis of urea as described later.

The urea adduct crystals separated in the separator 116 are fed into a separating tank 119 through pipe 117 and are heated by a heating pipe 120 to bring about separation into a layer 121 of the urea adduct producing agent and a layer 122 of a urea melt (concentrated aqueous solution of urea). The urea melt layer is taken out through pipe 123 and is made crystalline urea or granular urea through conventional finishing step. The layer of the urea adduct producing agent is fed back to the reactor 112 through pipe 124 and is reused for the production of the urea adduct.

Figure 2:
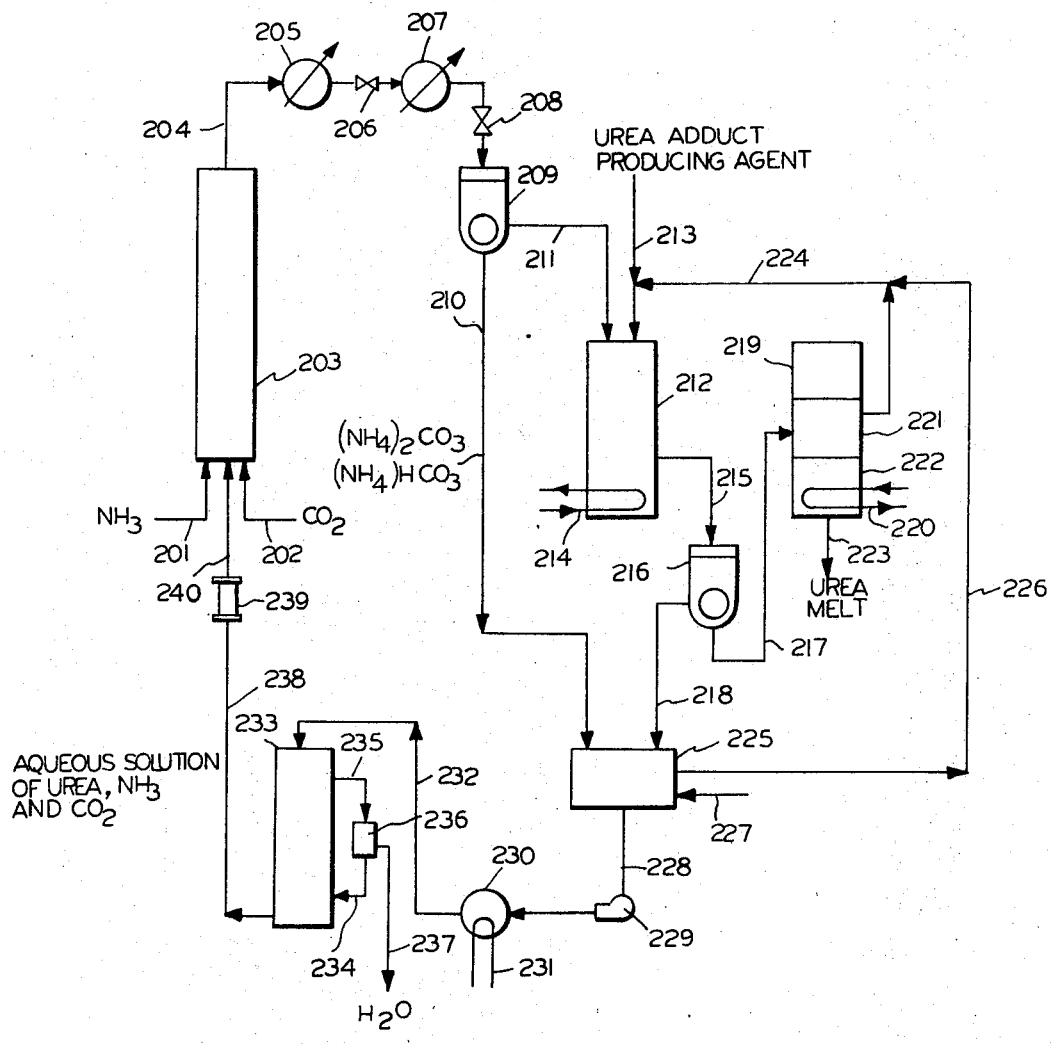

FIG. 2 shows a complete recycle process of the present invention as applied to the synthesis of urea wherein the mol ratio of ammonia to carbon dioxide is about 2 to 3:1. Ammonia coming through pipe 201, carbon dioxide coming through pipe 202 and an aqueous solution containing ammonia, carbon dioxide and urea coming through pipe 240 are introduced into a urea synthesizing autoclave 203 and are caused to react at 160 to 220° C. under 130 to 400 kg./cm.² (gauge). The urea synthesis effluent from the urea synthesizing autoclave 203 is introduced into a precooler 205 through pipe 204 and is cooled to about 50° C. in the same manner as in the process shown in FIG. 1. The urea synthesis effluent cooled in the precooler 205 has its pressure reduced to 0 to 2 kg./cm.$^2$ (gauge) through a pressure reducing valve 206 and is introduced into a crystallizer 207 so that a part of the unreacted ammonia and carbon dioxide contained in the effluent may be deposited as crystals of ammonium carbonate and ammonium bicarbonate at a temperature of 30 to 40° C. at which little or no urea is crystallized. The urea synthesis effluent from the crystallizer 207, if necessary, has its pressure reduced to normal pressure through a pressure reducing valve 208, is introduced into a separator 209 and is separated there into an aqueous solution containing urea, ammonia and carbon dioxide and crystals of ammonium carbonate and ammonium bicarbonate. The crystals of ammonium carbonate and ammonium bicarbonate from the separator 209 are introduced into a mixing tank 225 through pipe 210.

On the other hand, the aqueous solution from the separator 209 is introduced into a reactor 212 through pipe 211 so that a urea adduct producing agent introduced through pipe 213 and the urea in the aqueous solution may react with each other there to produce urea adduct crystals. In this case, small amounts of crystals of ammonium carbonate and ammonium bicarbonate may be deposited. However, these crystals are dissolving by adding a small amount of water or are recovered as gaseous ammonia and carbon dioxide in a later described separating tank 219. The temperature of the reactor 212 is kept at 30 to 40° C. by a cooler 214. The aqueous solution containing the produced urea adduct crystals is introduced into a separator 216 through pipe 215 and is separated into the urea adduct crystals and an aqueous solution containing ammonia, carbon dioxide and urea. The separated aqueous solution is introduced into a mixing tank 225 through pipe 218.

The separated urea adduct crystals are introduced into the separating tank 219 through a pipe 217 and are heated by a heating pipe 220 so as to be separated into a layer 221 of the urea adduct producing agent and a layer 222 of a urea melt (concentrated aqueous solution of urea). The urea melt layer is taken out through pipe 223 and is made up into crystalline or granular urea through a conventional finishing step. The layer of the urea adduct producing agent is recirculated to the reactor 212 through pipe 224 and is reused for the production of the urea adduct.

The amonium carbonate and bicarbonate crystals introduced into the mixing tank 225 through pipe 210 and the aqueous solution containing amonia, carbon dioxide and urea introduced through pipe 218 are mixed together by being stirred slowly, thereby a small amount of the unreacted urea adduct producing agent contained by said aqueous solution separates from the resulting mixture and floats on the surface of the mixture. The separated urea adduct producing agent is circulated to the reactor 212 through pipes 226 anud 224. Furthermore, the ammonium carbonate and ammonium bicarbonate in the form of an aqueous solution or crystals accompanying the urea adduct crystals are separated in the separating tank 219 and finishing step as gaseous ammonia and carbon dioxide and are introduced into the mixing tank 225 through pipe 227. The aqueous solution containing ammonia, carbon dioxide and urea, containing crystals of ammonium carbonate and ammonium bicarbonate and coming out of the mixing tank 225 has its pressure elevated to 1 to 5 kg./cm.$^2$ (gauge) by a pump 229 to which it passes through pipe 228, is introduced into a heating tank 230, is heated to 70 to 110° C., by a heating pipe 231, and thus is liquefied. The aqueous solution containing ammonia, carbon solution and urea coming out of the heating tank 230 is introduced into a concentrator 233 through pipe 232 and is brought counter-currently into contact with a carrier gas comprising gaseous ammonia, carbon dioxide or a mixture of them as introduced through pipe 234 to remove only water from said aqueous solution by the carrier gas. The amount of water removed is an amount substantially equivalent to the amount calculated by subtracting the amount of water accompanying the urea adduct crystal from the sum of the amount of water produced by the urea synthesizing reaction and water introduced from outside the system. The carrier gas containing moisture and discharged through pipe 235 is dehumidified in a dehumidifier 236, is then circulated to the concentrator 233 through pipe 234 and is reused. The water separated in the dehumidifier 236 is taken out through a pipe 237. The concentrated aqueous solution containing urea and unreacted ammonia and carbon dioxide is withdrawn from the concentrator 233 through pipe 238, has its pressure elevated to the urea synthesizing pressure by a pressure elevating pump 239 and is introduced into the urea synthesizing autoclave 203 through pipe 240.

Figure 3:
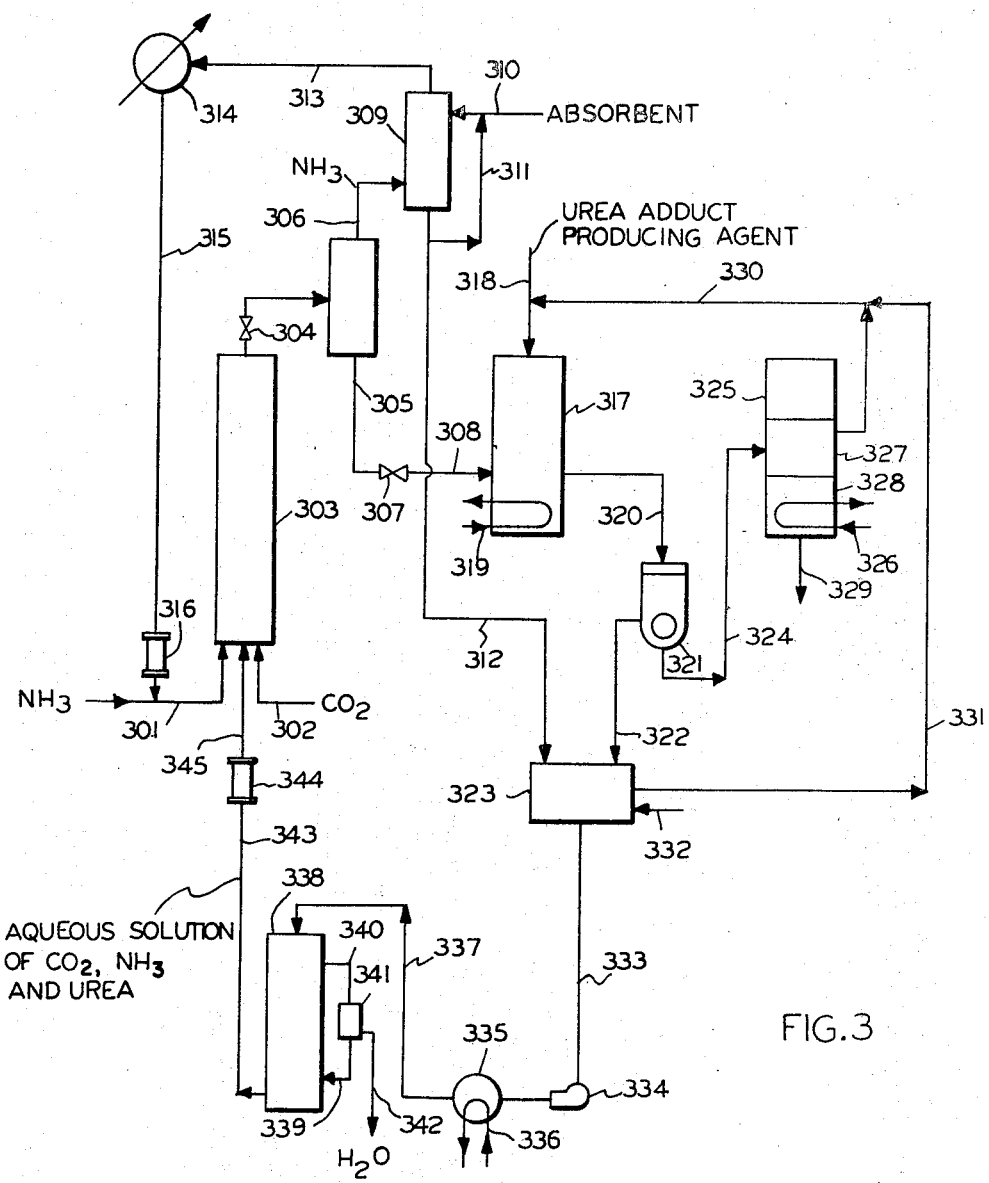

FIG. 3 shows a complete recycle process of the present invention as applied to the urea synthesis wherein the mol ratio of ammonia to carbon dioxide is about 3 to 6:1. Ammonia coming through pipe 301, carbon dioxide coming through pipe 302 and an aqueous solution containing ammonia, carbon dioxide and urea coming through pipe 345 are introduced into a urea synthesizing autoclave 303 and are made to react at 160 to 220° C. under 150 to 400 kg./cm.$^2$ (gauge). The urea synthesis effluent from the urea synthesizing autoclave 303 has its pressure reduced to 10 to 30 kg./cm.$^2$. (gauge) through a pressure reducing valve 304, is introduced into an excess ammonia separator 305 wherein the greater part of excess ammonia is separated. The urea synthesis effluent having the excess ammonia separated is further cooled as required, has its pressure reduced to normal pressure through a pressure reducing valve 307 and is introduced into a reactor 317 through pipe 308.

The separated excess ammonia is introduced into a washing column 309 through pipe 306, is washed with water or aqueous ammonia solution introduced through pipe 310, has the small amount of carbon dioxide contained thereby removed, and is then introduced through pipe 313 into an ammonia condenser 314 where the ammonia is liquefied. The resulting liquid amonia from the ammonia condenser 314 has its pressure elevated by a pressure elevating pump 316 through pipe 315 and is introduced together with new ammonia into the urea synthesizing autoclave 303 through the pipe 301.

A part of the resulting absorbate which has absorbed the carbon dioxide contained in the excess ammonia in the washing column 309 is introduced into a mixing tank 323 through pipe 312. The rest of the absorbate is circulated into the washing column 309 through pipe 311 together with a new absorbent (whose amount is equivalent to the amount of the absorbate fed into the mixing tank 323) introduced through the pipe 310.

A urea adduct producing agent is introduced into the reactor 317 through pipe 318 and is caused to react with the urea in the urea synthesis effluent to form urea adduct crystals. The reaction temperatuure is kept preferably at 30 to 40° C. by a cooling pipe 319. In this reaction, if crystals of ammonium carbonate and ammonium bicarbonate are deposited, they should be dissolved by adding water or recovered as gaseous ammonia and carbon dioxide in a separating tank 325 described later. The aqueous solution containing the produced urea adduct crystals is introduced into a separator 321 through pipe 320 and is separated into the urea adduct crystals and an aqueous solution containing ammonia, carbon dioxide and urea. The separated aqueous solution is introduced into a mixing tank 323 through pipe 322.

The urea adduct crystals are introduced into a separating tank 325 through pipe 324 and are heated there by a heating pipe 326 to separate into a layer 327 of the urea adduct producing agent and a layer 328 of a urea melt (concentrated aqueous solution). The urea adduct producing agent is circulated to the reactor 317 through pipe 330 and is reused for the production of a urea adduct. The urea adduct is taken out through pipe 329 and is made crystalline or granular urea by a conventional finishing step. Furthermore, any ammonium carbonate and ammonium bicarbonate in the form of an aqueous solution or crystals accompanying the urea adduct crystals are separated in the separating tank 325 and the finishing step, as gaseous ammonia and carbon dioxide, and are introduced into the mixing tank 323 through pipe 332.

The aqueous solution containing ammonia and carbon dioxide coming through pipe 312, the aqueous solution containing ammonia, carbon dioxide and urea coming through pipe 322 and the gaseous ammonia and carbon dioxide coming through pipe 332 are introduced into the mixing tank 223 and are mixed together by being stirred slowly, thereby the small amount of the unreacted urea adduct producing agent contained by the resulting mixture separates from the resulting mixture and floats on the surface of the mixture. This urea adduct producing agent is recycled to reactor 317. The pressure of the remaining mixture is elevated to 1 to 5 kg./cm.$^2$ (gauge) by a pump 334 to which it is passed through pipe 333. This mixture then is introduced into a heating tank 335 and is heated to 70 to 110° C. by a heating pipe 336 to form a solution. The resulting aqueous solution containing ammonia, carbon dioxide and urea coming out of the heating tank 230 is introduced into a concentrator 338 through pipe 337 wherein it is brought countercurrently into contact with a carrier gas comprising ammonia, carbon dioxide or a mixture of them as introduced through pipe 339 to remove only water from the aqueous solution by the carrier gas. The amount of water removed there is an amount substantially equivalent to the amount calculated by subtracting water accompanying the urea adduct crystal from the sum of the amount of water produced by the urea synthesizing reaction and water introduced from outside the system. The carrier gas containing moisture discharged through pipe 340 is dehumidified in a dehumidifier 341 and then circulated to the concentrator 338 through pipe 339. The water removed in the dehumidifier 341 is discharged through pipe 342. The aqueous solution containing urea and unreacted ammonia and carbon dioxide withdrawn from the concentrator 338 through pipe 343 has its pressure elevated by a pressure elevating pump 344 and is introduced into the urea synthesizing autoclave through pipe 345.

Examples of the present invention are shown in the following. In the examples, the parts are by weight.

EXAMPLE 1

A urea synthesis effluent having a composition of 60 parts of urea, 34 parts of ammonia, 44 parts of carbon dioxide and 18 parts of water obtained under urea synthesizing conditions of 180° C. and 180 kg./cm.$^2$ (gauge) was cooled to 70° C., was fed together with 27 parts of diluting water into a reactor and was maintained at a temperature of 32° C. 10 parts of n-hexadecane were added to the effluent to product a urea adduct. 47 parts of the produced urea adduct crystals were separated by a centrifugal separator from the aqueous solution then consisting of 28 parts of urea, 32 parts of ammonia, 42 parts of carbon dioxide, 43 parts of water and 1 part of n-hexadecane.

The urea adduct crystals were fed into a separating tank and were heated to 130° C. so as to be separated into two liquid layers of 9 parts of n-hexadecane and 38 parts of a urea melt. The 9 parts of n-hexadecane were circulated to the reactor. The urea melt in the lower layer (containing about 32 parts urea, 2 parts water, 2 parts ammonia and 2 parts carbon dioxide) had the greater part of the contained water removed and was then dropped through a nozzle by a conventional method so as to be granulated. Thus 32 parts of granular urea having a biuret content of 0.5% were obtained.

The aqueous solution from which the urea adduct crystals had been separated was treated to remove the contained 1 part of n-hexadecane and was then used as a raw material for producing chemical fertilizers.

EXAMPLE 2

A urea synthesis effluent having a composition of 60 parts of urea, 51 parts of ammonia, 66 parts of carbon dioxide and 40.5 parts of water obtained under urea synthesizing conditions of 190° C. and 210 kg./cm.$^2$ (gauge) was cooled to 50° C. in a precooler, its pressure was reduced to normal pressure, and it was introduced into a crystallizer where it was cooled to 37° C. to deposit a part of the unreacted ammonia and carbon dioxide as crystals having a composition of 18 parts of ammonia, 35 parts of carbon dioxide and 14.3 parts of water. The urea synthesis effluent after the crystals were separated had a composition of 60 parts of urea, 33 parts of ammonia, 31 parts of carbon dioxide and 26.2 parts of water. This urea synthesis effluent was introduced into a reactor where it was kept at a temperature of 30 to 32° C. and 9 parts of n-octadecane were gradually added thereto to produce a urea adduct. In this case, 20 parts of water were added to prevent ammonium carbonate and ammonium bicarbonate from being simultaneously deposited as crystals. 42.5 parts of the produced urea adduct crystals were separated from the aqueous solution which then consisted of 30 parts of urea, 32.5 parts of ammonia, 30.5 parts of carbon dioxide, 42.7 parts of water and 1.0 part of n-octadecane. The separated urea adduct crystals were introduced into the separating tank and were heated to 130° C. so as to be separated into two layers, a layer of n-octadecane and a layer of a urea melt. 8 parts of n-octadecane in the upper layer were recirculated to the reactor. The urea melt in the lower layer was treated in the same manner as in Example 1 to obtain 30 parts of granular urea and 3.5 parts of water. The aqueous solution from which the urea adduct crystals had been separated was introduced into a mixing tank and was mixed with the crystals containing 18 parts of ammonia, 35 parts of carbon dioxide and 14.3 parts of water deposited in the crystallizer and 0.5 part of ammonia and 0.5 part of carbon dioxide (ammonia and carbon dioxide accompanying the urea additive crystal) recovered in the separating tank. The contained 1.0 part of n-octadecane was separated and circulated to and reused in the reactor. The pressure of this mixture was elevated to 4 kg./cm.$^2$ (gauge). The mixture was introduced in to a concentrator and was brought counter-currently into contact with a mixed gas of ammonia and carbon dioxide in a mol ratio of $NH_3/CO_2$ of about 5 to remove 25.5 parts of the contained water. The aqueous solution coming out of the concentrator contained 30 parts of urea, 51 parts of ammonia, 66 parts of carbon dioxide and 31.5 parts of water. Its pressure was elevated to 210 kg./cm.$^2$ (gauge) and it was fed into the urea synthesis autoclave together with 17 parts of new ammonia and 22 parts of carbon dioxide.

EXAMPLE 3

A urea synthesis effluent having a composition of 70 parts of urea, 102 parts of ammonia, 17.1 parts of carbon dioxide and 30 parts of water obtained under urea synthesizing conditions of 190° C. and 300 kg./cm.$^2$ (gauge) was reduced in pressure to 16 kg./cm.$^2$ (gauge). It was introduced into an ammonia separator and 69 parts of ammonia, 2.1 parts of carbon dioxide and 1.7 parts of water were separated at a temperature of about 115° C. The separated excess ammonia was washed with water, had all the contained carbon dioxide absorbed and removed together with a part of ammonia, was condensed in an ammonia condenser, was recovered as 66 parts of liquid ammonia and was recirculated to the urea synthesis zone. The urea synthesis effluent from which the excess ammonia was separated was cooled, then its pressure was reduced to normal pressure and it was introduced into a reactor. 18 parts of 1-hexadecene were added to this urea synthesis effluent and was caused to react with urea at a temperature of 30 to 32° C. so as to produce urea adduct crystals. 83.3 parts of the produced urea adduct crystals were separated from the aqueous solution which then contained 10 parts of urea, 31.5 parts of ammonia, 13.7 parts of carbon dioxide, 22.3 parts of water and 3.0 parts of 1-hexadecene. The urea adduct crystals were heated to 130° C. in a separating tank and separated into a layer of n-octadecene and a layer of a urea melt. 15 parts of 1-hexadecene in the upper layer were recirculated to the reactor. The urea melt in the lower layer was treated in the same manner as in Example 1 to obtain 60 parts of granular urea. The aqueous solution containing urea, ammonia, carbon dioxide and 1-hexadecene obtained after separating the urea adduct crystals was mixed in a mixing tank with the aqueous solution consisting of 3 parts of ammonia, 21 parts of carbon dioxide and 17 parts of water coming from the excess ammonia washing step and 1.5 parts of ammonia and 1.3 parts of carbon dioxide recovered in the separating tank. The contained 3 parts of 1-hexadecene were removed and recirculated to the reactor. The mixture remaining was then brought countercurrently into contact with a mixed gas of ammonia and carbon dioxide having a mol ratio $NH_3/CO_2$ of about 5.3:1 at 110° C. and 4 kg./cm.$^2$ (gauge) in a concentrator wherein 12 parts of the contained water were removed. The aqueous solution from the concentrator consisted of 10 parts of urea, 36 parts of ammonia, 17.1 parts of carbon dioxide and 12 parts of water. The pressure of this solution was elevated to 300 kg./cm.$^2$ (gauge) and was introduced together with 34 parts of new ammonia and 44 parts of carbon dioxide into the urea synthesizing autoclave.

What is claimed is:

1. In a cyclic process for producing urea wherein ammonia is reacted with carbon dioxide in a urea synthesis zone to form an effluent containing urea, water, unreacted ammonia and unreacted carbon dioxide, and wherein the unreacted ammonia and unreacted carbon dioxide are recirculated into the urea synthesis zone, that improvement comprising, adding to said effluent a compound from the class consisting of n-paraffins and n-olefins having 6 to 25 carbon atoms and such n-paraffins and n-olefins having a substituent from the class consisting of phenyl, cyclohexyl, phenyloxycarbonyl, and cyclohexyloxycarbonyl on a terminal carbon atom thereof in an amount of about 0.25 to about 0.55 part by weight per part by weight of urea to be removed from said effluent thereby forming a crystalline adduct of urea and said compound, at a temperature not greater than about 40° C., separating said crystalline adduct from said effluent, decomposing the separated adduct at a temperature of 90° to 130° C. to release urea and said compound, recovering said released urea, removing an amount of water substantially equivalent to that amount calculated by subtracting the amount of water removed during separation of the crystalline adduct from the effluent, from the amount of water produced in the urea synthesis from said effluent containing unreacted ammonia, unreacted carbon dioxide and the remaining portion of the water after removal of said adduct and recycling said effluent after removal of said urea adduct and said water to said urea synthesis zone.

2. Process as claimed in claim 1 wherein water in an amount sufficient to dissolve ammonium carbonate and ammonium bicarbonate crystallized together with said urea adduct is added to said effluent prior to separating said adduct therefrom.

3. Process as claimed in claim 1 wherein a portion of the unreacted carbon dioxide and ammonia in said effluent is removed from said effluent prior to forming said adduct.

4. Process as claimed in claim 1 wherein said compound released by decomposition of said adduct is returned to the adduct forming step for successively forming additional adduct.

5. Process as claimed in claim 1 wherein said compound is n-hexadecane.

6. Process as claimed in claim 1 wherein said compound is n-octadecane.

7. Process as claimed in claim 1 wherein said compound is 1-hexadecene.

References Cited

UNITED STATES PATENTS

| | | | |
|---|---|---|---|
| 3,298,949 | 1/1967 | Nelson | 260—555 X |
| 2,811,553 | 10/1957 | Kamlet | 260—555 |
| 2,569,984 | 10/1951 | Fetterly | 260—555 X |

OTHER REFERENCES

J. E. Cline: Manufacture of Urea: A Literature Survey, Tennessee Valley Authority, Division of Chemical Engineering Research & Engineering Branch Research Section, Wilson Dam, Ala. pp. 52–53, Mar. 6, 1951.

LEON ZITVER, Primary Examiner

M. W. GLYNN, Assistant Examiner

U.S. Cl. X.R.

260—96.5